Feb. 8, 1949.  M. R. HUTCHISON, JR  2,461,159
PULL-DOWN MECHANISM FOR MOTION-PICTURE PROJECTORS
Filed July 23, 1947  2 Sheets-Sheet 1
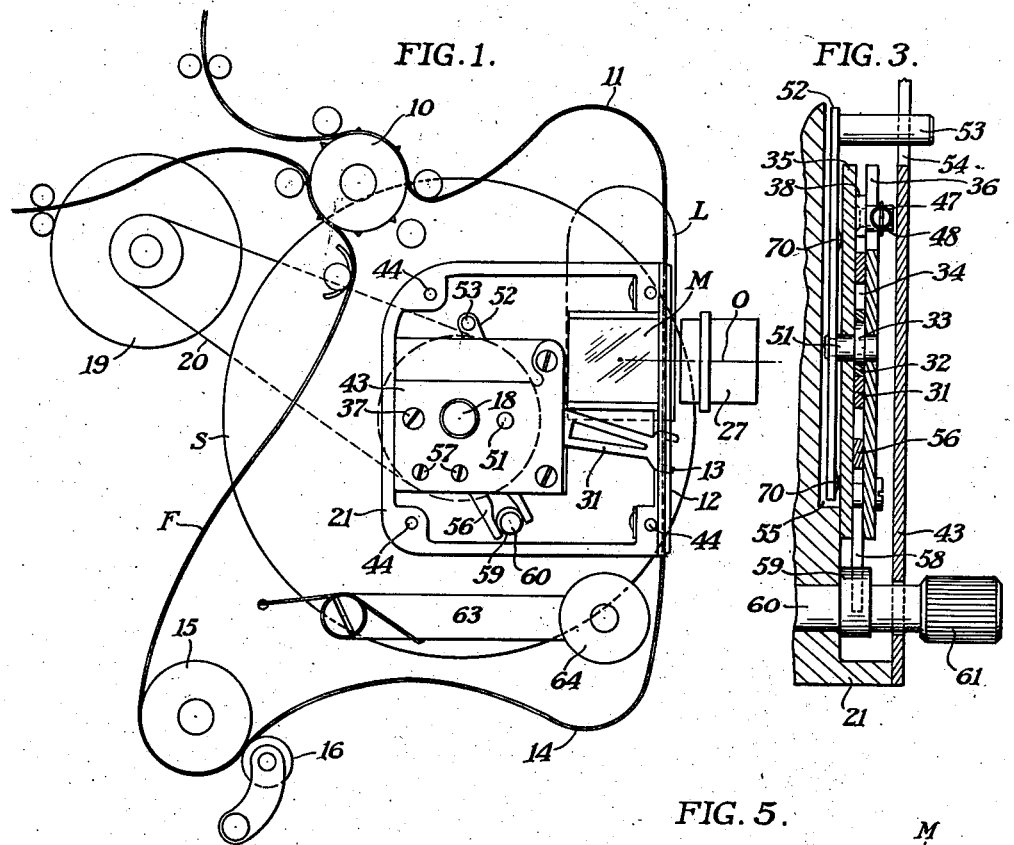
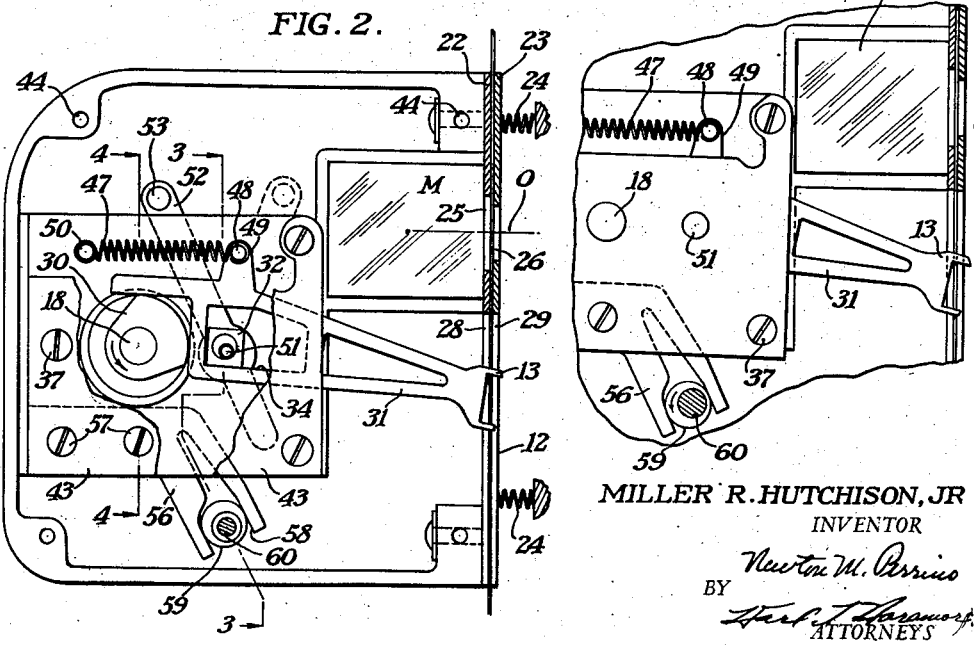
MILLER R. HUTCHISON, JR
INVENTOR

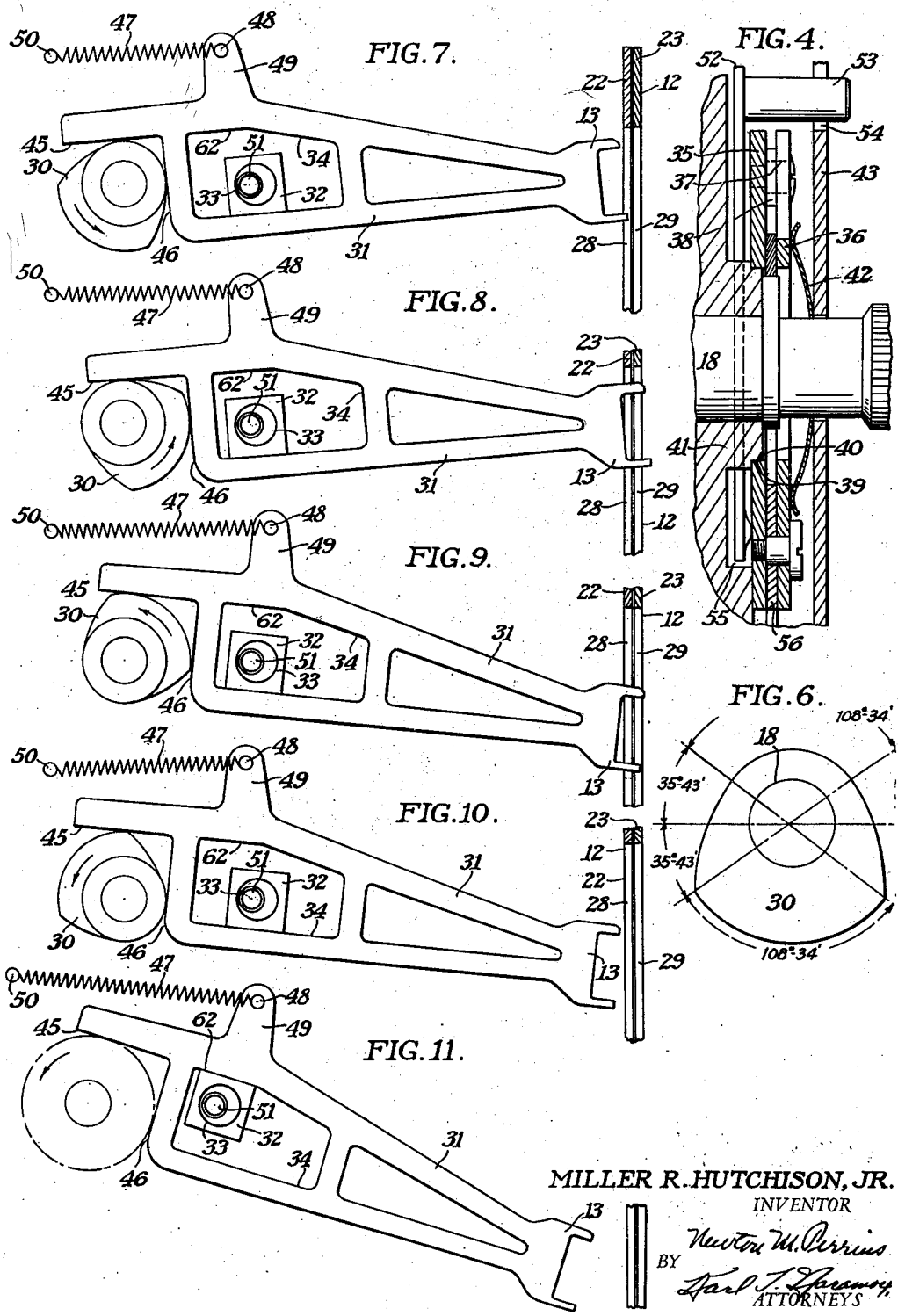

Patented Feb. 8, 1949

2,461,159

UNITED STATES PATENT OFFICE 2,461,159

PULLDOWN MECHANISM FOR MOTION-PICTURE PROJECTORS

Miller R. Hutchison, Jr., Rochester, N. Y., assignor to Eastman Kodak Company, Rochester, N. Y., a corporation of New Jersey Application July 23, 1947, Serial No. 763,081

11 Claims. (Cl. 88—18.4)

The present invention relates to improvements in motion-picture projectors and particularly relates to an improved intermittent film-advance mechanism.

Although many types of intermittent film-advancing mechanisms for projectors have been devised in the past, these known mechanisms possess certain disadvantages in spite of the great amount of effort and development work which have been devoted to this problem.

The primary object of the present invention is the provision of an intermittent film-transport mechanism of the claw type which possesses the following advantages strived for in the art: The need for precision workmanship, close fitting and skillful adjustment is almost eliminated; compensation for a considerable amount of wear is effected automatically; frictional forces, ordinarily parasitical, are turned to good advantage and starting torque and power are reduced; replacement of worn parts is easily and cheaply done with but simple tools and ordinary skill; adequate lubrication is readily provided and requires attention only at long intervals; claw wear at the film perforations is negligible and it is not necessary to employ special wear-resistant materials to secure durability; gate threading may be done without interference, regardless of claw position, and threading trial before projection is unnecessary; film passing through the gate is not disturbed laterally by the claw but is actually stabilized by it, while side guiding with a very light spring is sufficient for picture steadiness whereby film buckle from this cause is eliminated and overall focus is improved; impact between claw and film perforations is eliminated and complete compensation is afforded for change of perforation spacing due to film shrinkage whereby "film pick" noise is prevented and the life of the film perforations is increased by matching the claw stroke to perforation spacing through a simple customer-made adjustment; a lost loop can be restored in an instant without interrupting the picture show and restoration of the loop is without risk to the film; picture framing is accomplished without loss of efficiency or the use of oversized lenses and the picture is always centered in the gate; the moving parts of the mechanism are of great stiffness, yet of such light weight and low inertia that vibration is negligible; and picture projection is not impaired by employing a low gate tension with consequent benefit to the film and gate surfaces.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a partial side elevational view of a motion-picture projector incorporating a film-advancing mechanism constructed in accordance with a preferred embodiment of the present invention;

Fig. 2 is an enlarged side elevation of that portion of Fig. 1 including the film-advancing mechanism and the film gate and with the cover plate removed from the housing for the film-advancing mechanism;

Fig. 3 is an enlarged sectional view taken substantially on line 3—3 of Fig. 2;

Fig. 4 is an enlarged sectional view taken substantially on line 4—4 of Fig. 2;

Fig. 5 is a partial view similar to Fig. 2 but showing the parts in the position they assume when the frame-adjusting member is adjusted through approximately 90 degrees from the position shown in Fig. 2;

Fig. 6 shows the geometric configuration of the pull-down cam;

Figs. 7–10 are enlarged views of the claw and associated driving mechanism therefor showing the relative positions the parts assume when the claw is starting its introductory movement into the film, starts its pull-down stroke, begins its withdrawal from the film and starts its recovery or return stroke respectively; and Fig. 11 shows the inactive position the claw may take and does take during the threading operation, reformation of a lost loop, rupture of the spring 47, etc.

Like reference characters refer to corresponding parts throughout the drawings.

Referring now to the drawings and particularly Fig. 1, the present invention is shown in conjunction with a motion-picture projector in which the film F is pulled from a supply reel (not shown) by a sprocket 10 which feeds it into a loop 11 in advance of a film gate 12. The film is fed intermittently through the gate by a double-ended claw 13 and into a loop 14 beyond the gate from which it is fed over a drum 15 and back to the sprocket 10 which, in turn, feeds it to a take-up reel, not shown. In the projector illustrated the drug 15 is a sound drum on which the film is held by a spring-pressed roller 16, but if the projector happens to be one for the projection of silent film only, this drum may be omitted or be replaced with a guide roller to direct the film from the lower loop back to the sprocket 10.

While it is of no import to the present invention, I have shown the projector as one having a bent, or deflected, light beam for picture projection rather than one having the customary straight light beam. This type of light beam is well known in the art, one being shown in U. S. Patent 1,997,328 and merely comprises mounting the lamp L to one side of the film gate and the projection lens axis and deflecting the light beam through the aperture of the gate by means of a 45 degree mirror M. With this arrangement, the shutter S, which is a large and rather heavy disk, is mounted on a shaft 18 extending parallel to the plane of the film in the gate, so that it intercepts the light beam in advance of its striking the mirror. The shutter and shaft 18 are driven from a motor 19 by means of a belt 20 and the sprocket 10 may be geared to the shutter shaft by any suitable gearing, not shown. The sprocket 10, shutter shaft 18, drum 15, etc., will be journalled on a vertical mechanism plate (not shown) and on the face of which is formed, or is suitably mounted, a housing 21 in which the intermittent film-advancing mechanism to be described is disposed.

The film gate 12, the construction of which is not critical to the present invention, is shown as one of the type in which the film is held in a flat plane as it moves past the film gate aperture. This gate comprises a fixed member 22 on the lamp side of the film and fixed to and closing the forward end of the housing 21. It also includes a floating member 23 on the lens side of the film which is mounted to move to and from the fixed member under the action of springs 24 (see Fig. 2) to press the film against the fixed member of the gate and locate it accurately in a given plane. The fixed and floating gate members are provided with aligned projection apertures 25 and 26 respectively which are centered with respect to the optical axis O of the projecttion lens 27 and, consequently, the axis of the light beam. The aperture 26 in the floating member is the smaller of the two and constitutes the masking means for the projected picture frame of the film. The film F is fed through the gate by the double-ended claw 13 which engages the perforations at one edge of the film only and the lower end of each of the gate members 22 and 23 are provided with elongated slots 28 and 29 respectively to permit the end of the claw to extend therethrough during the time it is in engagement with the film.

The previously-described or equivalent elements for all types of motion-picture apparatus are well known and per se form no part of the present invention.

Coming now to the present invention, my intermittent film-advancing mechanism comprises a peripheral pull-down cam 30 of the form best shown in Fig. 6 which is rigidly connected to a portion of the shutter shaft 18 extending through the base of the housing 21. The film is advanced by a double-ended claw 13, the two teeth of which lie in the same plane and are spaced so as to engage successive perforations of a film. The claw 13 forms a part of a pull-down lever 31 which is pivotally supported by a trunnion comprising a block 32 rotatably mounted on a pin 33. The entire pull-down lever 31 and claw 13 forming a part thereof is monoplanar and constructed of thin steel stock (approximately .040 inch) to obtain featherweight lightness and thereby reduce the inertia of the claw so that the force required to move it and the vibration resulting from its movement is reduced to a minimum. To provide the necessary stiffness in the claw pull-down lever, so far as its working stroke is concerned, the lever is made of a truss-like construction as illustrated. The rectangular opening 34 resulting from this truss-like construction and embracing the trunnion block 32 results in the desirable advantage that the pull-down lever may drop to an inoperative position when required, as will be hereinafter fully described.

The pull-down lever is laterally positioned by being sandwiched between two plates 35 and 36 which are connected together by any suitable means, such as screws 37. To allow the pull-down lever 31 to oscillate freely between the plates, the plates are held apart by spacers 38 which encircle the screws and are slightly thicker than the pull-down lever. As clearly shown in Fig. 4, the inner plate 35 of the pair has a bore 39 adapted to engage a shoulder 40 on a boss 41 extending upwardly from the bottom of the housing; the shoulder being of such depth as to insure the pull-down lever lying in the plane of the cam 30 when the unit is mounted on the shoulder and pressed down against the face of the boss. This unit (comprising the two plates 35 and 36 and the pull-down lever) is normally forced against the face of the boss by a spring member 42 carried by the inside of the cover plate 43 which is adapted to be mounted on the housing by screws (not shown) receivable in tapped openings 44 at the four corners of the housing (see Fig. 1).

The left-hand end of the pull-down lever includes a horizontal follower surface 45 and a vertical follower surface 46 which are at right angles to one another and which are adapted to engage the periphery of the cam 30. These two follower surfaces are normally held in engagement with the cam by a spring 47 which is fastened at one end to a pin 48 fixed to an arm 49 of the lever and at the other end to a pin 50 fixed to and extending from the plate 35. Thus, the pull-down lever is moved in one plane (its own) under the influence of the cam 30 and spring 47 to cause an intermittent advance of the film. It is important that the cam rotate in the direction illustrated by the arrow in Fig. 7 (counter-clockwise) so that the frictional forces between the cam and follower surfaces may be utilized and the force of the spring may be reduced to a minimum. Furthermore, with the present arrangement the claw mechanism is capable of only a forward or film-advancing movement and cannot be used for reverse operation since the claw would tend to jump off the cam.

Referring now to Figs. 7–10, Fig. 7 shows the claw starting its introductory movement into the film path. The cam displaces the vertical follower surface 46 of the lever while supporting the horizontal one. The spring 47 opposes this displacement and is aided by the frictional forces acting on the lever in the horizontal plane. With the cam construction used, the introductory stroke is completed in about 72 degrees of cam rotation and there follows a dwell of about 18 degrees during which the clam 13 is poised just above or actually in contact with the lower edge of the film perforation.

Fig. 8 shows the claw starting its pull-down stroke. The cam 30 displaces both horizontal and vertical follower surfaces of the lever, the latter through supporting the vertical surface of the lever as it rocks and slides on the trunnion block 32. The spring resists the displacement and is aided in maintaining trunnion contact by the frictional resistance to film movement in the gate. The vertical frictional forces between the cam and lever assist in lowering the load borne by the horizontal follower surface. The pull-down stroke is completed in 60 degrees of the cam rotation and is followed by an 18-degree dwell during which the claw rests upon the lower edge of the film perforation to prevent film spring-back. During the stroke, the claw advances the film without relative sliding motion between them. This is so because as the claw both pivots and slides at the trunnion block during pull-down, the rocking of the vertical follower surface upon the circular cam dwell produces sufficient "in-out" movement of the claw to compensate for the "in-out" movement due to lever oscillation. This compensating action is under design control and may be complete or just sufficient as not to exceed the "in-and-out" freedom of the film in the gate when engaged by the claw.

Fig. 9 illustrates the beginning of the withdrawal of the claw from the film perforation. The spring 47 furnishes part of the force required and the balance is supplied by the frictional force at the horizontal follower surface in contact with the cam. The cam contour controls this motion of the lever and withdrawal of the claw is completed in about 72 degrees of cam rotation. There follows a dwell of about 18 degrees.

Fig. 10 depicts the start of the claw recovery stroke. The spring 47 furnishes the necessary force unassisted, this being the "slow-return" stroke of the mechanism in which accelerations are low. Completion of the recovery stroke occupies about 84 degrees of cam rotation and is followed by an 18-degree dwell. The claw is then in the position shown in Fig. 7 and has completed a complete working cycle in one revolution of the cam.

The allocation of time to various movements and dwells of the claw is under the designer's control to an extent sufficient to meet requirements of film advance consistent with good shutter efficiency. In the modification disclosed, the shutter efficiency is approximately 50%.

A novel feature of this pull-down mechanism is the adjustment provided in the length of claw stroke. By this means the claw stroke may be shortened to correspond to the reduced perforation spacing of shrunken film. Unless this is done, or is capable of being accomplished, noisy operation results, known as "pick noise" and film and claw wear are accelerated. This noise comes about with shrunken film because the claw, upon its introductory stroke, is disposed considerably above the lower edge of the film perforation and then when the pull-down stroke starts, the claw moves freely until it strikes the bottom of the film perforation with a considerable impact which produces noise and wear.

To change the stroke of the present pull-down mechanism, the trunnion block 32 is moved horizontally so as to change the mechanical advantage of the pull-down lever 31. While this adjustment may be accomplished in many different ways, I have shown the pin 33, about which the trunnion is rotatably supported, as being eccentrically fixed to the end of a stub shaft 51 which is, in turn, rotatably mounted in the rear plate 35. Fixed to the end of stub shaft 51 is a lever 52 having a handle 53 fixed thereto and adapted to extend across the plane of the pull-down lever and out through a slot 54 in the cover plate 43 of the housing so as to be available for manual adjustment. (See Fig. 3.) By swinging the lever 52 between the full line and dotted line positions, shown in Fig. 2, a full stroke adjustment of some .010-inch is possible with the present mechanism. The front face of the adjusting lever 52 is provided with a pair of protuberances 70, one on each side of the pivot point, which are adapted to engage the outside face of plate 35, and provides sufficient friction to hold the lever in any position of adjustment. The face of the boss in the bottom of the housing is provided with a recess 55 to receive the lever 52 and allow for its adjustment. The stroke of the claw can be adjusted while the pull-down is operating and is judged by the "pick noise" accompanying the film advance. A proper adjustment of the stroke will eliminate all "pick noise."

By use of the present pull-down mechanism, the picture can be readily put "in frame" by displacing the claw vertically to alter the position at which the claw finishes its pull-down stroke relative to the aperture in the gate. While this may be done in any way which would effect the vertical displacement of the trunnion block 32, I have provided a simple and convenient means for doing this which is particularly adapted to the present arrangement of parts. To this end, I mount a framing arm 56 between the plates 35 and 36 by means of a pair of screws 57 so that the arm is out of the way of cam 30 and constitutes a part of the unit comprising the pull-down mechanism. (See Figs. 2 and 3.) This framing arm includes a slotted end 58 which extends below the plates 35 and 36 substantially radially of the axis of the cam 30. Disposed in this slot is an eccentric cam 59 which is carried by a shaft 60 journalled in the boss of the housing and terminating in an adjusting knob 61 accessible from the outside of the cover for the housing. (See Figs. 2 and 3.) By adjusting the eccentric 59 by manipulation of knob 61, the entire unit comprising the pull-down mechanism and including plates 35 and 36 and trunnion block 32 is rotated about the axis of the pull-down cam 30, since the bore 39 in plate 35 is rotatably supported on shoulder 40 of the boss in the bottom of the housing, thus resulting in a vertical adjustment of the trunnion block 32. Figs. 2 and 5 show the eccentric cam 59 in positions of adjustment varying by about 90 degrees and also show the two positions of the claw mechanism resulting from such an adjustment.

This framing adjustment can also be made while the pull-down mechanism is operating and, in any case, the framing adjustment will have negligible effect upon the length of the claw stroke and vice versa. Optical efficiency is improved by framing with the claw for then the film, being dependent on the claw for advance, is brought to rest in frame in coincidence with the fixed optical axis of the projector. The slot in end 58 of framing arm 56 is purposely extended, as shown in Fig. 2, so as to, in effect, provide some measure of resiliency in the two parts of the arm engaging the eccentric 59 so that these parts normally press against both sides of the eccentric and, consequently, there is no undesirable back-lash in the framing adjustment.

The present pull-down mechanism possesses the further advantages that it permits immediate redistribution of film without stopping the machine and it permits gate threading without interference from the claw in whatever its position relative to the gate. The claw, when overtaken by the film, only weakly resists and readily assumes the inactive position shown in Fig. 11. In other words, the spring 47 gives and the lever 31 swings around the pull-down cam 30 until the trunnion block 32 comes against the straight portion 62 of the upper edge of the rectangular opening 34 and in which position the claw is removed from the gate. As soon as the film movement stops, the pull-down lever resumes its normal position and normal film-feeding operation. Thus, if the lower film loop 14 becomes lost or reduced for any reason, it is only necessary for the operator to press down on the lever 63 carrying the loop-forming roller 64 to reform the loop while the machine is in operation. Should failure of the spring 47 occur at any time, the pull-down lever automatically assumes the inactive position shown in Fig. 11 and no damage is done to the film which will continue to be drawn through the gate by the film sprocket 10. In Fig. 11 the pull-down cam 30 is illustrated as a circle, the diameter of which is equal to that of the larger dwell portion of the cam in order to illustrate that the pull-down lever can assume this position regardless of the continued rotation of the cam. Furthermore, this inactive position of the pull-down lever is exaggerated in Fig. 11 to emphasize this feature of the pull-down mechanism. Actually, should the pull-down lever be moved to an inactive position by movement of the film while the spring 47 was still intact, the claw 13 would not be held completely removed from the gate as shown but would in effect lie against the film in the gate and act in the manner of a ratchet.

When it is desired to thread the film through the gate, the position of the claw relative to the gate is of no concern. By introducing the loop of film in the top of the gate first and then pulling it downwardly while inserting it edgewise, then if the claw happens to be extending into the gate it will be forced down and out of the gate by the film to a position approximating that shown in Fig. 11, so that the film will be able to assume its proper position in the gate. Then, without further attention, the machine can be started and the claw will start its normal feeding motion and will eventually pick up a perforation should the film fail to be properly aligned for claw engagement upon threading.

Automatic compensation for wear is provided by the take-up action of the spring 47 and by the manual adjustments for stroke length and framing. Lubrication of the pull-down mechanism is provided by constructing one or both of the plates 35 and 36 of a porous metal which is charged with lubricant. Rubbing lightly against the plate, the moving parts pick up a film of oil sufficient for the purpose, any excess being sponged up by the plates before it can escape. One charge of lubricant will last for a long period of operation.

The great stiffness of the featherweight pull-down lever arises from its truss-like form, the lateral support afforded it by plates 35 and 36, and the absence of forces acting other than in the single plane of the lever. A further advantage of the design is its ready production by inexpensive punch-press methods of blanking and shaving followed by simple heat treatment. There are no close tolerances required in the fabrication of the cam or the lever because of the nature of their cooperation. Film passing through the gate is not disturbed laterally by the claw, but actually is stabilized by it, so that side guiding of the film in the gate with a very light spring is sufficient for picture steadiness. Film buckle from this cause is eliminated and overall focus is improved.

Ease of claw replacement is an outstanding feature of the present mechanism. By removal of the outer plate 36 and detachment of the spring 47 from its stationary support, both claw and spring are removed and are as readily replaced. The entire operation requires less time than to rewind a 2000-foot film and adjustments are unnecessary. No special skill or training is necessary to complete the job successfully without other tools than a screw driver for removing the three screws 37 to release plate 36 from plate 35.

Although I have shown and described certain specific embodiments of my invention, I am fully aware that many modifications thereof are possible. My invention, therefore, is not to be limited to the precise details of construction shown and described but is intended to cover all modifications coming within the scope of the appended claims.

Having thus described my invention, what I claim is new and desire to secure by Letters Patent of the United States is:

1. An intermittent film pull-down mechanism for use in a motion-picture projector having a film gate through which a perforated film is adapted to be advanced past a projection aperture and comprising a peripheral cam having its axis lying in a plane substantially parallel to the plane of the film in the gate, means for continuously rotating said cam in a direction counter to that of the direction of film movement through the gate, a trunnion block located between said cam and said gate, a monoplanar pull-down lever having a straight surface intermediate its ends engaging the lower side of said trunnion block for constituting a fulcrum for said lever, a claw on one end of said lever for engaging the perforations in the film passing through said gate, top and front follower surfaces on the other end of said lever at substantially right angles to one another for engaging the periphery of said cam, whereby said cam effects the introductory and pull-down strokes of said lever and claw, and a spring acting on a portion of said lever above said trunnion block to hold said follower surfaces against said cam and pivot the lever counter-clockwise about said trunnion, whereby said spring and the frictional forces between the cam and horizontal follower surface furnishes the force necessary to withdraw the claw from the film perforation at the end of a pull-down stroke and the spring alone furnishes the necessary force to return the claw to its starting position.

2. A pull-down mechanism according to claim 1, and including means for adjusting said trunnion block in its own plane and in a line substantially parallel to the film gate for framing purposes, and means for adjusting said trunnion block in its own plane and in a line substantially perpendicular to said gate to alter the length of stroke of the claw, said two last-mentioned means being independent of one another and so arranged that an adjustment of the trunnion block by one thereof and the change in claw stroke caused thereby does not materially affect the adjustment of the trunnion block by the other or the change in claw stroke resulting therefrom.

3. A pull-down mechanism according to claim 1, and including means for adjusting said trunnion block, and hence the fulcrum of the lever, in a direction substantially concentric with the axis of said cam to alter the point at which the claw finishes its pull-down stroke for purposes of framing the film with respect to the aperture in the gate.

4. A pull-down mechanism according to claim 1, and including means for adjusting said trunnion block, and hence the fulcrum of the lever, radially of the axis of said cam and relative to the lever to alter the mechanical advantage of the lever and hence the length of stroke of the claw to compensate for any change in the spacing of the film perforation due to film shrinkage.

5. A pull-down mechanism according to claim 1, and in which said lever is provided with an aperture substantially larger than said trunnion block and encompassing said block, one edge of said aperture being said straight surface of the lever normally engaging the lower side of said block and the edge of said aperture opposite said straight surface being spaced from said surface by an amount substantially greater than the width of the trunnion in this direction to permit the claw end of the lever to drop down by an amount sufficient to remove the claw thereon from the film gate under the action of a force acting on the claw end of the lever in the direction of movement of the film without the lever becoming disengaged from said trunnion block.

6. An intermittent film pull-down mechanism for use in a motion-picture projector having a film gate through which a perforated film is adapted to be advanced past a projection aperture and comprising in combination a peripheral cam having its axis lying in a plane substantially parallel to the plane of the film in said gate, means for continuously rotating said cam in a direction counter to that of the direction of film movement through the gate, a trunnion block located between said cam and said gate, a monoplanar pull-down lever having a straight surface intermediate its ends engaging the lower side of said trunnion block for providing a fulcrum for said lever, a claw on one end of said lever for engaging the perforations in the film passing through said gate, top and front follower surfaces on the other end of said lever at substantially right angles to one another for engaging the periphery of said cam, a spring acting on a portion of said lever above said trunnion block to hold said follower surfaces against said cam and pivot said lever counter-clockwise about the axis of said trunnion, and means for varying the point at which said claw ends its pull-down stroke in the gate for framing purposes, said means comprising a normally stationary plate lying parallel and adjacent to said pull-down lever and oscillatable about the axis of said cam, said trunnion mounted on said plate to move therewith, and manually adjustable means for oscillating said plate, and along therewith the trunnion and pull-down lever, about the axis of said cam.

7. An intermittent film pull-down mechanism for use in a motion-picture projector having a film gate through which a perforated film is adapted to be advanced past a projection aperture and comprising in combination a peripheral cam having its axis lying in a plane substantially parallel to the plane of the film in said gate, means for continuously rotating said cam in a direction counter to that of the direction of film movement through the gate, a trunnion block located between said cam and said gate, a monoplanar pull-down lever having a straight surface intermediate its ends engaging the lower side of trunnion block for providing a fulcrum for said lever, a claw on one end of said lever for engaging the perforations in the film passing through said gate, top and front follower surfaces on the other end of said lever at substantially right angles to one another for engaging the periphery of said cam, a spring acting on a portion of said lever above said trunnion block to hold said follower surfaces against said cam and pivot said lever counter-clockwise about the axis of said trunnion, and means for varying the point at which said claw ends its pull-down stroke in the gate for framing purposes, said means comprising a normally stationary plate lying parallel and adjacent to said pull-down lever and oscillatable about the axis of said cam, said trunnion mounted on said plate to move therewith, an arm fixed to said plate and having a slotted end extending substantially radially of said cam axis, an eccentric rotatably-mounted on an axis which is parallel to said cam axis and disposed within the slotted end of said arm, and a manually-operated adjusting member for rotating said eccentric to cause an oscillation of said plate, and along therewith the trunnion and pull-down lever, about the axis of said cam.

8. An intermittent film pull-down mechanism for use in a motion-picture projector having a film gate through which a perforated film is adapted to be advanced past a projection aperture and comprising in combination a peripheral cam having its axis lying in a plane substantially parallel to the plane of the film in said gate, means for continuously rotating said cam in a direction counter to that of the direction of film movement through the gate, a trunnion block located between said cam and said gate, a monoplanar pull-down lever having a straight surface intermediate its ends engaging the lower side of said trunnion block for providing a fulcrum for said lever, a claw on one end of said lever for engaging the perforations in the film passing through said gate, top and front follower surfaces on the other end of said lever at substantially right angles to one another for engaging the periphery of said cam, a spring acting on a portion of said lever above said trunnion block to hold said follower surfaces against said cam and pivot said lever counter-clockwise about the axis of said trunnion, and means for adjusting the length of stroke of the claw comprising a normally stationary plate lying parallel and adjacent to said pull-down lever, a supporting member adjustably mounted on said plate and supporting said trunnion block, and means for manually adjusting said supporting member to shift said trunnion block radially of the axis of said cam and relative to said lever to alter the mechanical advantage of said lever.

9. An intermittent film pull-down mechanism for use in a motion-picture projector having a film gate through which a perforated film is adapted to be advanced past a projection aperture and comprising in combination a peripheral cam having its axis lying in a plane substantially parallel to the plane of the film in said gate, means for continuously rotating said cam in a direction counter to that of the direction of film movement through the gate, a trunnion block located between said cam and said gate, a monoplanar pull-down lever having a straight surface intermediate its ends engaging the lower side of said trunnion block for providing a fulcrum for said lever, a claw on one end of said lever for engaging the perforations in the film passing through said gate, top and front follower surfaces on the other end of said lever at substantially right angles to one another for engaging the periphery of said cam, a spring acting on a portion of said lever above said trunnion block to hold said follower surfaces against said cam and pivot said lever counter-clockwise about the axis of said trunnion, and means for adjusting the length of stroke of the claw comprising a normally stationary plate lying parallel and adjacent to said pull-down lever, a stub shaft rotatably mounted on said plate and having its axis substantially parallel to said cam axis, an eccentric carried by said shaft and rotatably supporting said trunnion block, and an adjusting lever on the end of said shaft to permit manual rotation of the shaft and eccentric thereon, whereby the trunnion block is shifted radially of the axis of said cam and relative to said lever to alter the mechanical advantage of said lever.

10. A pull-down mechanism for use in a motion-picture projector having a film gate through which a perforated film is adapted to be intermittently advanced past a projection aperture and comprising in combination a peripheral cam having its axis lying in a plane substantially parallel to the plane of the film in said gate, means for continuously rotating said cam in a direction counter to the direction of movement of the film through the gate, a plate extending perpendicular to the axis of said cam and lying adjacent the cam and oscillatable about the cam axis, a stub shaft rotatably mounted on said plate and having its axis substantially parallel to the cam axis and disposed between the axis of the cam and the film gate, an eccentric fixed to said stub shaft, a trunnion block rotatably mounted on said eccentric, a monoplanar pull-down lever having a straight surface intermediate its ends engaging the lower side of said trunnion block, a claw on one end of said lever for engaging the perforations in the film passing through said gate, top and front follower surfaces on the other end of said lever at substantially right angles to one another for engaging the periphery of said cam, resilient means acting on said lever so as to pivot said lever counter-clockwise about the axis of said trunnion and to hold said follower surfaces against the periphery of said cam, a manually-adjustable lever fixed to said stub shaft for rotating the same and the eccentric thereon to adjust said trunnion block radially of the cam axis and relative to said lever for altering the mechanical advantage of the lever to change the length of pull-down stroke, a slotted arm fixed to said plate and extending substantially radially of said cam axis, a second eccentric mounted on an axis substantially parallel to the cam axis and disposed in the slot of said arm to engage opposite sides thereof, and manually-adjustable means for rotating said second eccentric to oscillate said plate, and the trunnion block and lever associated therewith, about the cam axis for framing purposes.

11. A pull-down mechanism according to claim 10, characterized by the fact that the pull-down lever includes a trunnion-block confining wall opposite and spaced from said straight surface of said lever by a distance greater than the width of said block, and which wall is adapted to engage the trunnion block, to prevent the lever from dropping away from engagement with the cam, when said lever is forced clockwise about its fulcrum by a force acting on the claw end thereof in the direction of movement of the film through the gate.

MILLER R. HUTCHISON, JR.

REFERENCES CITED

The following references are of record in the file of this patent:

UNITED STATES PATENTS

| Number | Name | Date |
|---|---|---|
| 2,095,744 | Hanna | Oct. 12, 1937 |
| 2,384,597 | Calvin et al. | Sept. 11, 1945 |

FOREIGN PATENTS

| Number | Country | Date |
|---|---|---|
| 539,852 | Great Britain | Sept. 26, 1941 |